Sept. 2, 1947.  E. I. FULMER ET AL  2,426,677
PROCESS FOR CONVERTING CELLULOSE INTO SUGAR
Filed Dec. 15, 1941
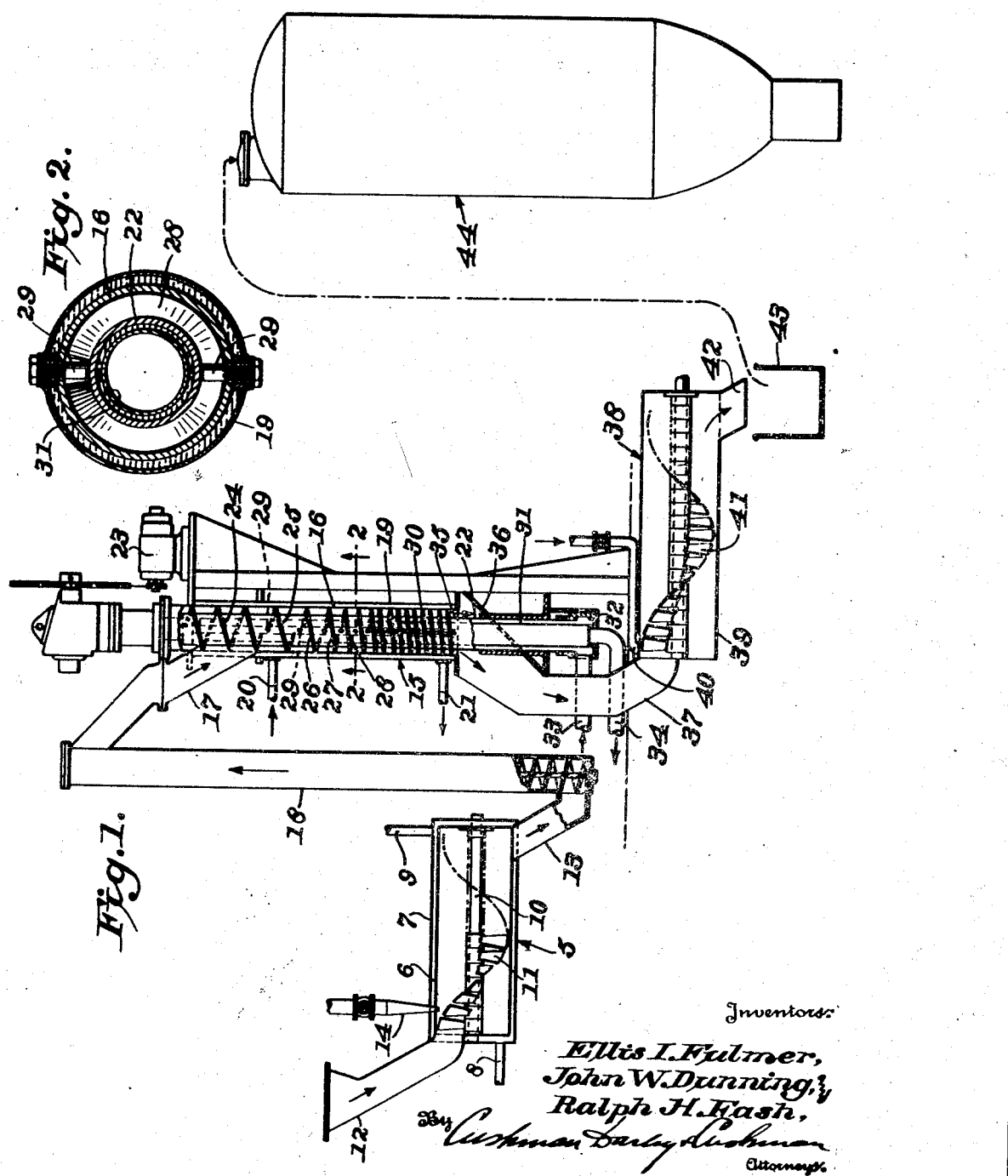
Inventors:
Ellis I. Fulmer,
John W. Dunning,
Ralph H. Kash,
By
Attorneys Patented Sept. 2, 1947

2,426,677

UNITED STATES PATENT OFFICE 2,426,677

PROCESS FOR CONVERTING CELLULOSE INTO SUGAR

Ellis I. Fulmer, Ames, Iowa, and John W. Dunning, Abilene, and Ralph H. Fash, Fort Worth, Tex., assignors, by mesne assignments, to Anderson, Clayton & Co., Houston, Tex., a corporation of Delaware Application December 15, 1941, Serial No. 423,110

10 Claims. (Cl. 127—37)

This invention relates to the conversion of cellulosic materials into sugar and other conversion products by means of the direct treatment of the materials with sulphuric or other strong mineral acid, such as hydrochloric acid.

Procedures heretofore devised for transforming cellulosic materials into sugar consist essentially in treating the materials in a number of ways with a relatively large amount of an aqueous or gaseous mineral acid or with an organic acid, with or without various organic diluents, at varying temperatures and for varying lengths of time. In order to transform the initial degradation product of the cellulosic material into sugar, the product must be subjected to a secondary dilute acid or water hydrolysis. A necessary preliminary to this second step, in ordinary practice, is the removal of acid from the initial product and this recovered acid, from an economic viewpoint, must be treated for reuse in the process. The costs of these prior processes are objectably increased by the necessity of these additional steps, namely the removal and the recovery of acid, and its reconcentration, and these costs are in fact such as to render the processes economically impracticable. Moreover, the necessity for removing acid from the initial degradation product by means of extraction with water or an organic diluent leads to the extraction of some of the polysaccharides. In case organic diluents are used as an impregnating medium or as an acid extractant they too must be removed and recovered from the final sugar product.

It is the object of this invention to provide a direct process for the saccharification of cellulosic materials which will entirely avoid the difficulties and disadvantages of the prior processes above discussed, and to provide apparatus for effectively carrying out the process. This direct process requires the use of relatively small amounts of acid and does not necessitate subtraction of acid from the initial degradation product prior to its being hydrolyzed to sugar. There is thus obviated the necessity of a costly and sometimes dangerous recovery and reconcentration of acid prior to the secondary hydrolysis.

In accordance with the invention a relatively small amount of concentrated acid is made effective in the initial degradation step by subjecting the mixture of cellulosic material and acid to a powerful grinding-mixing-pressure action, such that the material is broken up and its surfaces are exposed and coated with the acid which is completely adsorbed, i. e. taken up by the material. The product thus obtained is directly mixed with water, in the absence of any intermediate acid-recovery operation, to dilute the acid so that hydrolysis may be effected. The grinding-mixing-pressure action not only serves to impregnate the material with the acid, in the absence of free-fluid acid, but it also greatly reduces the time required for the completion of the initial degradation reaction and it enables a larger amount of sugar to be ultimately obtained from the cellulosic material per unit of acid employed. The invention is not limited as to the cellulosic materials employed. Examples of those especially susceptible of treatment in accordance with the invention are wood, straw, grasses, cotton, wood pulp, cottonseed hulls, oat hulls and peanut hulls. Preferably the materials are reduced to coarsely divided form prior to treatment, but in any event they are in what we shall term herein "particle" form, which term is applicable to materials such as cottonseed hulls, oat hulls and the like whether they have been subjected to a special comminuting action or not.

As an example of the practice of the invention, the cellulosic material, for example in particle size of about 10 mesh, is dried to 1.0% to 10.0% moisture content, the drying temperature being preferably maintained below 100° C. The material is then mixed in any convenient manner and as uniformly as possible with a definite amount of relatively concentrated mineral acid. We may here add that the preliminary drying, above mentioned, should preferably be thorough so as to reduce the moisture content as far as possible. If the moisture content is as high as 10.0% the addition of the acid results in heating the material because of the reaction between the acid and the moisture. Therefore, for the greatest efficiency, we desire to have the moisture content low so as to prevent this heating which would result in reducing the final yield of sugar because of decomposition reactions which would occur at this point if the temperature were allowed to rise. To be on the safe side, however, we provide means for cooling the material-acid mass during mixing.

Preferably the mixing is accomplished as a continuous process with the acid being sprayed in regulated amount into the continuously fed cellulosic material. Or regulated amounts of the cellulosic material and acid may be sprayed together, the acid being projected by a suitable atomizer. Effective proportions are from 20% to 35% by weight of 80% sulphuric acid, although in some cases these limits may be passed in one direction or the other. The concentration of acid is such that when a definite amount of acid is mixed with a definite amount of cellulosic material, the mixture of acid with the moisture content of the material results in an acid concentration of such strength that it will degrade the cellulosic material to simpler products. In the case of sulphuric acid this final concentration should be preferably above 72%.

The mixture of cellulosic material and acid is now subjected to a combined grinding-mixing-pressure action by means of any suitable apparatus of which an example will be given hereinafter. By this action the particles are powerfully worked and laid open so that their surfaces are coated with the acid and the acid is completely taken up and no free-fluid acid remains. The optimum pressure is that beyond which the percentage of volume reduction of the cellulosic material is small or negligible. For example, in the case of cottonseed hulls, this pressure is about 176 pounds per square inch and with saw-dust it is about 210 pounds per square inch. The invention is not necessarily limited to the use of these exact pressures, since they may be deviated from in either direction. For example, much higher pressures can be used, but they do not appreciably enhance impregnation and on the other hand they increase the temperature and so the cooling problem. The temperature of the cellulosic material and acid during mixing and impregnation is controlled, preferably being held below 40° C., in any suitable manner. Such cooling is, however, not required in all cases, since the materials may be in contact with each other for such a short period of time that temperatures higher than 40° C. will at times be advantageous. Unduly high temperatures in the case of prolonged contact of the substances must, however, be guarded against to prevent at this point, also, conversion of the polysaccharides into dextrose with subsequent decomposition of the dextrose which would result in reduction of the amount of sugar yielded.

The initial degradation product obtained as a result of the above treatment of the cellulosic material with acid is directly diluted with such an amount of water that the hydrolysis of the initial degradation product to sugar may be effected by any convenient means, for example in an autoclave at a pressure of fifteen pounds per square inch for ten minutes. The concentration of the diluted sulphuric acid may be, for example, 10%. The process may be, and preferably is, continuous up to the point at which the material is ready for charging into the autoclave.

In the accompanying drawing we have shown suitable apparatus, by way of example, for carrying out the new process and this apparatus will now be described. In the drawing:

Figure 1 is an elevation, partly in vertical section, of the system, and

Figure 2 is an enlarged section substantially on line 2—2 of Figure 1.

Referring to the drawing, reference numeral 5 designates generally a conveyor-mixer comprising a horizontally disposed cylindrical casing 6 provided with a water jacket having a cooling water inlet 8 and outlet 9. A shaft 10 journaled axially in the end walls of the casing has fixed thereon spirally arranged paddles 11. A feed hopper 12 for the cellulosic material is in communication with the upper portion of the chamber through one end wall thereof and an outlet chute 13 is in communication with the bottom of the chamber at its discharge end. Reference numeral 14 designates a valve-controlled atomizing nozzle for the acid, this nozzle communicating with the interior of the chamber just inwardly of the inlet opening. The cellulosic material is supplied in regulated amount to the hopper 12 and the acid nozzle is set to deliver acid in the required proportion. When the shaft 10 is rotated, by any suitable means, the paddles 11 act to mix the cellulosic material and acid while moving the mixture toward the outlet chute 13, cooling water being supplied to the jacket, if required, to hold down the temperature.

Reference numeral 15 designates generally an impregnator comprising a vertically cylindrical casing 16 having at its upper end an inlet opening connected through a tubular chute 17 with the discharge end of a screw conveyor 18 whose intake end is in receiving relation with the discharge chute 13. The conveyor drive is adjusted so that the output of the mixer is continuously delivered to the inlet opening of the casing 16. The latter is provided with a cooling-water jacket 19 having an inlet 20 and outlet 21. Or, if a counter-current is desired, 21 may be the inlet.

A tubular rotary shaft 22 extends coaxially within the casing 16 and is adapted to be rotated from a motor 23 through suitable transmission means at its upper end. Fixed around shaft 22 at the intake opening is a continuous screw blade 24 of large pitch. Below the blade 24 screw blade portions 25, 26, 27, 28, and so on, are secured around the shaft 22. Each of these last mentioned blade portions constitute slightly less than a complete convolution and the adjacent ends of the single convolutions are spaced somewhat axially so as to pass breaker bars or pins 29 which project radially into the space between casing 16 and shaft 22 as most clearly seen in Figure 2. The interrupted screw constituted by the blades 25, 26, and so forth, decreases in pitch downwardly to the blade 30 where the pitch may again become uniform down to the bottom end of casing 16. The ratio of the maximum to the minimum pitch is here contemplated as being about 6 to 1, although this can be varied in accordance with conditions and materials. The blades substantially fill the space between casing 16 and shaft 22 radially, as appears in Figure 2.

Mounted within shaft 22 is a pipe 31 and by means of a swivel coupling 32 cooling water from a pipe 33 can be introduced into the annular space between shaft 22 and pipe 31, flowing over the top end and into the latter and out through a pipe 34.

With shaft 22 rotating, material entering casing 16 through the chute 17 is caught by the screw and conveyed downwardly in the space between the casing and shaft. When the material comes into the range of pins or bars 29, it is prevented from following the screw around and is progressively subjected to higher compression as it follows the decreasing pitch of the spiral downwardly. During this time the blades as assisted by the bars 29, exert a powerful grinding-mixing action on the material so that the particles are broken up and their surfaces are exposed to the acid. Eventually the impregnated material, in the absence of free-fluid acid, emerges from the lower end opening 35 of the casing 16. Due to the small amount of acid used, the material, at this point rather in somewhat crumbly cake-like form than in the form of a slurry, drops onto an inclined chute 36 and into a descending conduit 37.

Reference numeral 38 designates generally a second conveyor mixer constructed like the first except that the water jacket is omitted. The chute 37 leads into an inlet opening of the casing 39 of the mixer and leading into the top of the casing adjacent the inlet opening is a valve-controlled water nozzle 40 by means of which water in proper quantity is supplied to the incoming material so as to dilute the acid. The spirally arranged paddles 41 break up the caked cellulosic material, mix it thoroughly with the water, and carry the mixture to a discharge chute 42 at the opposite lower end of the casing 39 whence the mixture flows into a receptacle 43 from which it may be charged into an autoclave 44. Preferably a battery of autoclaves is provided in order that the continuous output from the mixer 38 can be taken care of. However, the present invention is not limited as regards secondary hydrolysis procedure.

It will be evident that in the use of the described apparatus cellulosic material is continuously mixed with acid, continuously fed to an impregnator and continuously delivered by the latter to a mixer where water is added, and the product is continuously delivered ready for secondary hydrolysis. From the feeding of the cellulosic material into the mixer 5 until its discharge from the mixer 38 is a matter of minutes. Consequently, it will be evident that the new process is extremely economical as regards time as well as materials.

Using the described apparatus a typical procedure has been carried out as follows: Cottonseed hulls containing 1% moisture were fed at the rate of 300 pounds per hour into the first conveyor-mixer and were continuously mixed with 80% sulphuric acid at the rate of 94 pounds of acid per hour. This mixture was continuously fed into the impregnator which reduced the hulls to 16% of their initial volume and simultaneously ground and mixed the acid treated material. The reaction material was diluted with water in the second conveyor-mixer to give it an 8% sulphuric acid concentration. This slurry was maintained at 121° C. for 10 minutes in the autoclave with the result that 87% of the carbohydrates was converted into monosaccharides. It will be noted that this result was obtained by employing approximately 30 parts of sulphuric acid per 100 parts of cellulosic material. The yield was about 1.4 parts of sugar per 1 part of acid.

It will be evident that the invention may be practiced with procedural variations and with apparatus other than that herein disclosed by way of example. Consequently we do not limit ourselves in these respects, but define the scope of the invention in the following claims.

We claim:

1. The process of converting cellulose into sugar which comprises adding concentrated acid to cellulosic material which is in particle form, subjecting the acid-material mixture to a grinding-mixing-pressure action, the amount of added acid being such that as a result of the said action surfaces of the material are coated with the acid so that the cellulose is converted to polysacharides while the acid is completely taken up by the material, and directly mixing the product thus obtained with water to dilute the acid so that hydrolysis may be completed.

2. The process of converting cellulose into sugar which comprises adding to cellulosic material which is in particle form from about 20% to about 35% by weight of concentrated acid, subjecting the acid-material mixture to a grinding-mixing-pressure action so that as a result of the said action surfaces of the material are coated with the acid so that the cellulose is converted to polysaccharides while the acid is completely taken up by the material, and directly mixing the product thus obtained with water to dilute the acid so that hydrolysis may be completed.

3. The process of converting cellulose into sugar which comprises adding concentrated acid to cellulosic material which is in particle form, subjecting the acid-material mixture to a grinding-mixing-pressure action, the amount of added acid being such that as a result of the said action surfaces of the material are coated with the acid so that the cellulose is converted to polysaccharides while the acid is completely taken up by the material, controlling the temperature to prevent decomposition of the polysaccharides thus produced, and directly mixing the product thus obtained with water to dilute the acid so that hydrolysis may be completed.

4. The process of converting cellulose into sugar which comprises adding concentrated acid to cellulosic material which is in particle form, subjecting the acid-material mixture to a grinding-mixing-pressure action, the pressure employed being at least substantially that beyond which the percentage of volume reduction of the material is small, the amount of added acid being such that as a result of the said action surfaces of the material are coated with the acid so that the cellulose is converted to polysaccharides while the acid is completely taken up by the material, and directly mixing the product thus obtained with water to dilute the acid so that hydrolysis may be completed.

5. The process of converting cellulose into sugar which comprises adding to the cellulosic material which is in particle form from about 20% to about 35% by weight of concentrated acid, subjecting the acid-material mixture to a grinding-mixing-pressure action, the pressure employed being at least that beyond which the percentage of volume reduction of the material is small, surfaces of the material being coated with the acid so that the cellulose is converted to polysaccharides while the acid is completely taken up by the material as a result of the said action, and directly mixing the product thus obtained with water to dilute the acid so that hydrolysis may be completed.

6. The process of converting cellulose into sugar which comprises adding to cellulosic material which is in particle form from about 20% to about 35% by weight of concentrated acid, subjecting the acid-material mixture to a grinding-mixing-pressure action, the pressure employed being at least that beyond which the percentage of volume reduction of the material is small, surfaces of the material being coated with the acid so that the cellulose is converted to polysaccharides while the acid is completely taken up by the material as a result of the said action, controlling the temperature to prevent decomposition of the polysaccharides thus produced, and directly mixing the product thus obtained with water to dilute the acid so that hydrolysis may be completed.

7. The process of converting cellulose into sugar which comprises adding concentrated acid to cellulosic material which is in particle form, continuously withdrawing the acid-material mixture and continuously subjecting it to a grinding-mixing-pressure action, the amount of added acid being such that as a result of the said action surfaces of the material are coated with the acid so that the cellulose is converted to polysaccharides while the acid is completely taken up by the material, and continuously withdrawing the product thus obtained and directly mixing it with water to dilute the acid so that hydrolysis may be completed.

8. The process of converting cellulose into sugar which comprises adding concentrated acid to cellulosic material which is in particle form, subjecting the acid-material mixture to a grinding-mixing-pressure action from which the mixture emerges with the cellulose converted to polysaccharides and with no apparent free-fluid acid present, and directly mixing the product thus obtained with water to dilute the acid so that hydrolysis may be completed.

9. The process of converting cellulose into sugar which comprises impregnating cellulosic material which is in particle form with concentrated acid in amount such as to convert the cellulose to polysaccharides with complete sorption of the acid by the material, and directly mixing the impregnated material with water to dilute the acid so that hydrolysis may be completed.

10. The process of converting cellulose into sugar which comprises impregnating cellulosic material which is in particle form with from about 20% to about 35% by weight of concentrated acid so that the acid is completely taken up by the material, and directly mixing the impregnated material with water to dilute the acid so that hydrolysis may be completed.

ELLIS I. FULMER.
JOHN W. DUNNING.
RALPH H. FASH.

REFERENCES CITED

The following references are of record in the file of this patent:

UNITED STATES PATENTS

| Number | Name | Date |
|---|---|---|
| 1,220,778 | Ostenberg | Mar. 27, 1917 |
| 1,670,727 | Kocher | May 22, 1928 |
| 1,511,786 | Terisse | Oct. 14, 1924 |
| 1,677,406 | Perl | July 17, 1928 |
| 2,086,701 | Dreyfus | July 13, 1937 |

FOREIGN PATENTS

| Number | Country | Date |
|---|---|---|
| 147,415 | Great Britain | Oct. 7, 1921 |
| 259 | Great Britain | 1900 |
| 146,860 | Great Britain | Apr. 21, 1921 |